United States Patent
Cohen

(10) Patent No.: US 9,925,961 B2
(45) Date of Patent: *Mar. 27, 2018

(54) DEVICE WITH REMOVAL HEAD AND LIGHTING ELEMENT

(71) Applicant: Snow Joe, LLC, Edison, NJ (US)

(72) Inventor: Joseph S. Cohen, Edison, NJ (US)

(73) Assignee: SNOW JOE, LLC, Carlstadt, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,252

(22) Filed: Jan. 4, 2017

(65) Prior Publication Data

US 2017/0113660 A1  Apr. 27, 2017

Related U.S. Application Data

(63) Continuation of application No. 14/553,410, filed on Nov. 25, 2014, now Pat. No. 9,566,952.

(51) Int. Cl.
| | |
|---|---|
| *A47L 13/12* | (2006.01) |
| *B60S 3/04* | (2006.01) |
| *E01H 5/02* | (2006.01) |
| *F21V 33/00* | (2006.01) |

(52) U.S. Cl.
CPC ............... *B60S 3/045* (2013.01); *A47L 13/12* (2013.01); *E01H 5/02* (2013.01); *F21V 33/0084* (2013.01)

(58) Field of Classification Search
CPC ............. A47L 13/12; B60S 3/045; E01H 5/02
See application file for complete search history.

(56) References Cited

U.S. PATENT DOCUMENTS

| | | | | |
|---|---|---|---|---|
| 4,770,712 A | * | 9/1988 | Hopkins | B60S 3/045 134/6 |
| 5,179,754 A | * | 1/1993 | Stradnick | A47L 13/02 15/105 |
| 5,333,342 A | * | 8/1994 | Huang | A47L 13/02 15/105 |
| 6,749,318 B1 | * | 6/2004 | Palacios | B25F 1/003 30/169 |
| 2006/0021175 A1 | * | 2/2006 | Peroni | A47L 13/022 15/236.02 |
| 2007/0177269 A1 | * | 8/2007 | DePaoli | E01H 5/066 359/533 |
| 2009/0217471 A1 | * | 9/2009 | Weinberger | A46B 7/04 15/111 |
| 2014/0245557 A1 | * | 9/2014 | Cohen | B60S 3/045 15/236.01 |

OTHER PUBLICATIONS

PCT/US15/62165, International Search Report dated Feb. 2, 2016.*

* cited by examiner

*Primary Examiner* — Randall Chin
(74) *Attorney, Agent, or Firm* — Seyfarth Shaw LLP

(57) ABSTRACT

A device or tool for removing snow and other debris from vehicles, and other surfaces including a handle having a first end and a second end opposite the first end, a scraper portion coupled to the first end, and a head coupled to the second end. One or more light emitting elements are incorporated into the head to provide for ease of use in low light situations. The head may be a laterally extended foam head that is non-abrasive, freeze resistant, and durable. The handle may include a telescopic extension to allow a reach of a user to be increased or decreased allowing the user to clear away snow and other debris from various sizes of vehicles.

20 Claims, 6 Drawing Sheets

DEVICE WITH REMOVAL HEAD AND LIGHTING ELEMENT

CROSS REFERENCE TO RELATED APPLICATIONS DATA

This application is a continuation of and claims the benefit of U.S. patent application Ser. No. 14/553,410, now U.S. Pat. No. 9,566,952, entitled DEVICE WITH REMOVAL HEAD AND LIGHTING ELEMENT, filed Nov. 25, 2014, the contents of which are incorporated herein by reference in their entirety.

FIELD

The present disclosure relates to devices for removing snow and other debris from vehicles, structures, and other areas.

BACKGROUND

In general, during the winter months certain geographic areas experience colder temperatures and snowfall. During and after periods of snowfall, vehicles and other areas may be coated or covered with varying amounts of snow and ice. The efficiency and usefulness of current devices to remove such snow and ice are limited based on the amount of snowfall and the size of the vehicle.

SUMMARY

A device or tool for removing snow and other debris from vehicles, and other articles and structures is disclosed herein. In general, the extendable device includes a telescopic extension having a first end and a second end opposite the first end, a scraper portion coupled to the first end, and a removal head, for example a foam head disposed between two plates, coupled to the second end. One or more lighting elements, for example light emitting diodes (LEDs), may be embedded in the head to assist in illuminating an area around the head. This is useful when a user is using the device at night or in a low light type of situation.

The telescopic extension also allows the device to be adjusted for use by various users and to be used with various vehicles. By extending or retracting the device, the reach of the user can be increased or decreased allowing the user to clear away debris and snow from various sizes of vehicles. Driving with snow on top of a vehicle can be hazardous and in some instances may even be unlawful. The extendable device allows the user to reach not only a hood of the vehicle but also a top of the vehicle that may be difficult to reach with a conventional brush. Additionally, placement of the scraper portion on the opposite end of the removal head allows users to remove different kinds of debris (for example, ice versus snow) from a vehicle with a single device.

BRIEF DESCRIPTION OF THE DRAWINGS

An embodiment of an extendable device is illustrated in the figures of the accompanying drawings which are meant to be exemplary and not limiting, in which like references are intended to refer to like or corresponding parts, and in which.

DETAILED DESCRIPTION

Figure 1:
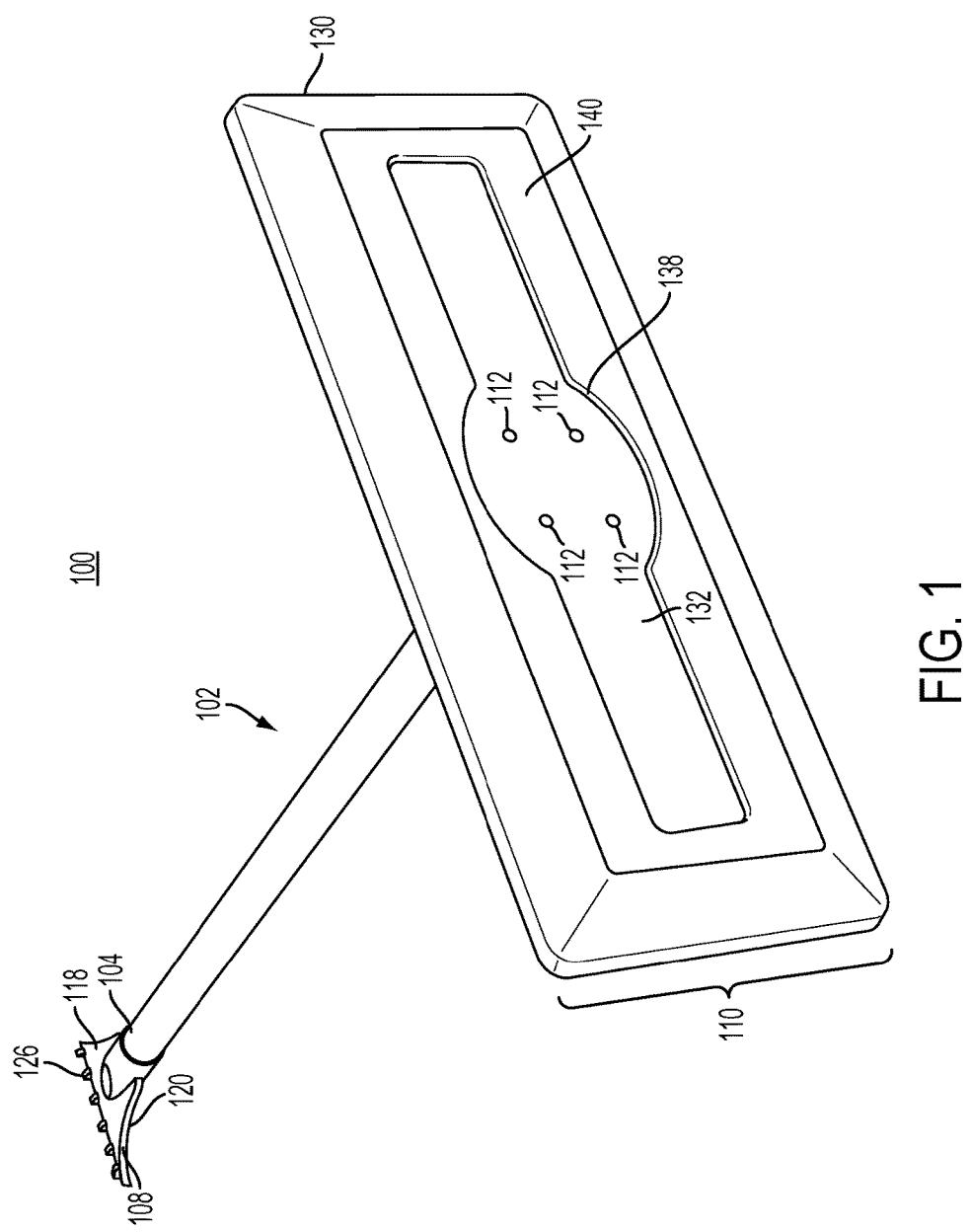
FIG. 1 illustrates a first perspective view of an extendable scraper and removal head having lighting elements according to the present disclosure.

Detailed embodiments of extendable devices for removing snow and other debris from vehicles, and other articles and structures are disclosed herein, however, it is to be understood that the disclosed embodiments are merely exemplary of the device, which may be embodied in various forms. Therefore, specific functional details disclosed herein are not to be interpreted as limiting, but merely as a basis for the claims and as a representative basis for teaching one skilled in the art to variously employ the present disclosure.

A device 100 for removing snow, ice, and other debris from vehicles, and other articles and structures according to an illustrative embodiment is described with reference to FIGS. 1-3. As illustrated, the device 100 includes a handle or extension 102 having a first end 104 and a second end 106 opposite the first end 104. A scraper portion 108 is coupled to the extension 102 at the first end 104, and a removal head 110 including one or more light emitting elements 112 is configured to couple to the extension 102 at the second end 106.

The extension 102 may be telescoping and include a locking feature to allow a length of the extension 102 to be adjusted and locked into place. As illustrated, the extension 102 may include one or more elongated portions, for example, a first elongated portion 114 and a second elongated portion 116, telescopically coupled together. The first elongated portion 114 may be configured to receive the second elongated portion 116, and the second elongated portion 116 may be configured to telescopically extend out of and retract into the first elongated portion 114. In this illustrative embodiment, the first elongated portion 114 is hollow, which allows the second elongated portion 116 to be received or slid into an end of the first elongated portion 114. In other illustrative embodiments, the second elongated portion 116 may be configured to receive the first elongated portion 114. In one embodiment, the extension 102 may be a non-extending handle.

The first elongated portion 114 and the second elongated portion 116 may be telescopically coupled together by various telescopic connection mechanisms. For example, the first elongated portion 114 and the second elongated portion 116 may be coupled together using a corresponding ball and detent mechanism, corresponding male and female engagement mechanisms, or other type of telescopic connection known in the art.

In an illustrative embodiment, the scraper portion 108 has a first side 118, a second side 120, a first end 122, and a second end 124. The first side 118 may have a convex shape and the second side 120 may have a corresponding concave shape causing the scraper portion 108 to be curved for engagement of first end 122 of the scraper portion 108 with a surface, for example, a window of a vehicle. The scraper portion 108 may also include one or more protrusions 126 projecting from the first side 118 of the scraper portion 108 proximate the first end 122. The one or more protrusions 126 may be useful in breaking, weakening, or scoring snow and ice. The second end 124 of the scraper portion 108 may be coupled to the first end 104 of the extension 102, for example, using one or more fasteners, adhesives, a male/female threaded engagement, and/or other coupling means of the type. Placement of the scraper portion 108 at the opposite end of the extension 102 from the removal head 110 allows a user to remove different materials (for example, ice versus snow) from a vehicle using the device 100.

The removal head 110 includes a first plate 128, a body portion or head 130, and a second plate 132. The removal head 110 is structured to enable pushing or pulling of debris, such as snow, leaves, etc. to remove the debris from a vehicle or structure. The removal head 110 is extended laterally to allow a larger amount of debris to be removed in a single push or pull by a user. The body portion 130 may be a foam head including a first recess 134 configured to receive the first plate 128 on a first side 136 of the body portion 130. Foam, or other compressible material, may be used on the removal head 110 to avoid scratching, or otherwise damaging a surface on which the debris is located. In addition to being non-abrasive, the material may preferably be freeze resistant and durable. The body portion 130 may include a second recess 138 configured to receive the second plate 132 on a second side 140 of the body portion 130. The first plate 128 and the second plate 132 may be disposed in the first recess 134 and the second recess 138, respectively, and configured to couple together and secure the body portion 130 between the first plate 128 and the second plate 132. The first recess 134 and/or the second recess 138 may reduce or prevent the first plate 128 and/or the second plate 132 from contacting, scratching, or otherwise damaging a surface, for example, a surface of a vehicle, when using the device 100 to remove snow or other debris from the vehicle.

The shapes of the first plate 128 and the second plate 132 generally include substantially oval central portions 142, 144, respectively, and substantially rectangular portions 146, 148, respectively, extending from the substantially oval central portions 142, 144, respectively. As illustrated, the substantially oval central portions 142, 144 have a cross-section larger than a cross-section of the substantially rectangular portions 146, 148, respectively. The substantially oval central portions 142, 144 provide support for the body portion 130 and restrict the bending motion of the body portion 130 when the device 100 is being used. This allows the device 100 to remove heavy amounts of snow and other debris from vehicles, and other articles and structures.

Figure 2:
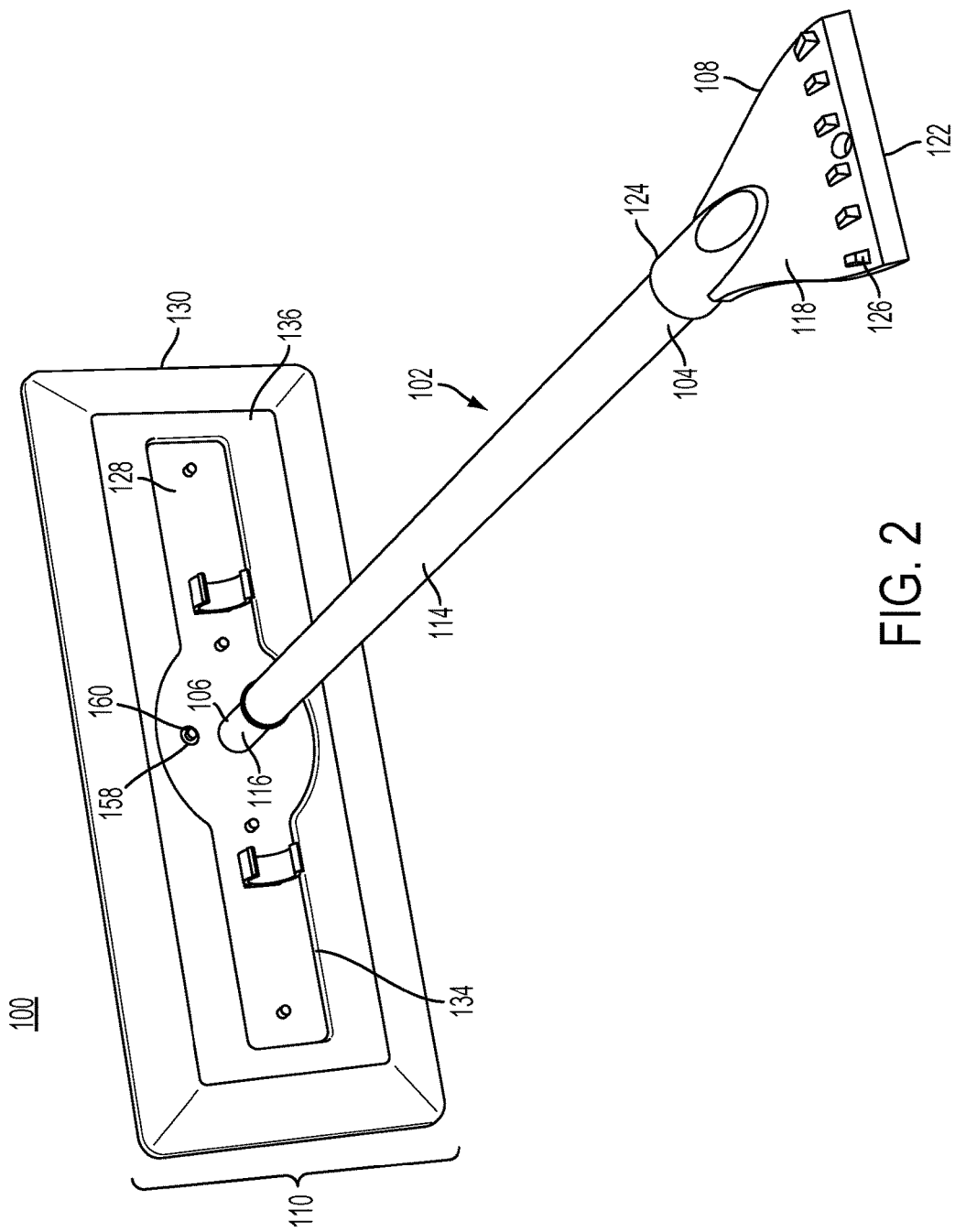
FIG. 2 illustrates a second perspective view of the extendable scraper and removal head having lighting elements of FIG. 1 according to the present disclosure.
Figure 3:
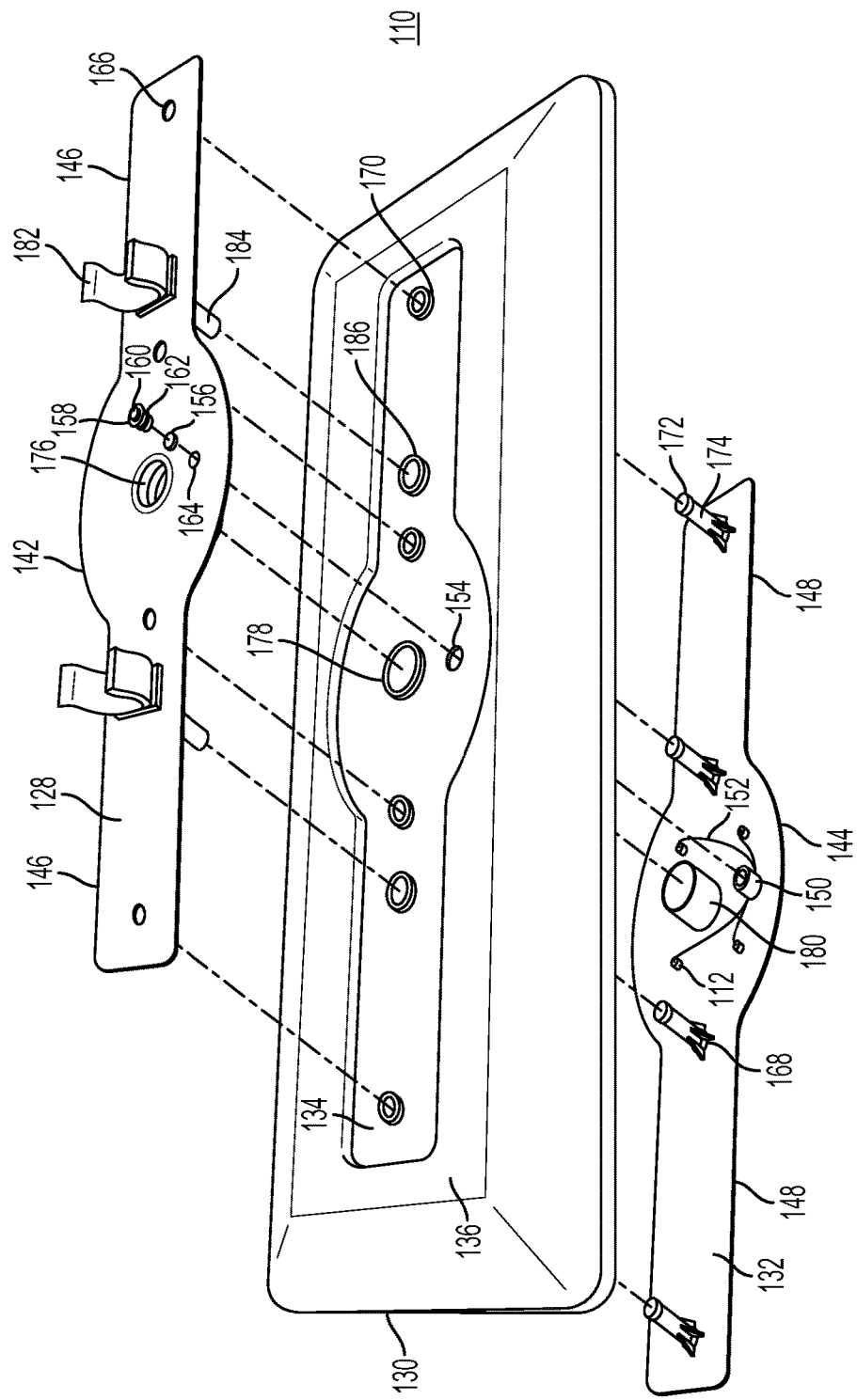
FIG. 3 illustrates an exploded view of the removal head of FIG. 1 according to the present disclosure.

Referring to FIGS. 1 and 3, one or more light emitting elements 112 may be embedded into or coupled to the removal head 110. The light emitting element(s) 112 may be light emitting diodes (LEDs), light bulbs, or other type of light emitting element known in the art. As illustrated in FIGS. 1 and 3, the light emitting elements 112 are embedded into the second plate 132 and configured to emit light in a direction away from the body portion 130. In this respect, the light emitting elements may illuminate an area around the removal head 110. This is useful when a user is using the device 100 at night or in a low light type of situation.

As illustrated in FIG. 3, the light emitting elements 112 are electrically coupled to a battery housing 150 via wiring 152. The battery housing 150 extends from the second plate 132 in a direction towards the first plate 128. In this respect, the battery housing 150 may extend through an aperture 154 in the body portion 130 and receive a battery 156. A battery housing cap 158 may be configured to mate with the battery housing 150 to secure the battery 156 in the battery housing 150. The battery housing cap 158 may include external threads that mate with internal threads of the battery housing 150 to couple the battery housing cap 158 to the battery housing 150. The battery housing cap 158 may also include a switch 160 configured to turn on and off the light emitting elements 112. For example, when the switch 160 is in an "on" position, current may be supplied from the battery 156 to the light emitting elements 112. Similarly, when the when the switch 160 is in an "off" position, current may be prevented from being supplied from the battery 156 to the light emitting elements 112.

An "O" ring 162 or other sealing type of element may be disposed around the battery housing cap 158 to seal the battery housing 150 and prevent snow, ice, water, and/or other debris from entering the battery housing 150. When assembled, the battery housing cap 158 extends through an aperture 164 in the first plate 128 and is coupled to the battery housing 150, while the switch 160 is accessible by a user from an external side of the first plate 128.

The light emitting elements 112, battery housing 150, wiring 152, battery housing cap 158, and switch 160, etc. may be sealed to prevent damage caused by external elements, such as, snow, ice, water, and/or other debris. The seal(s) may be provided by a coating, for example, a rubber, epoxy, resin, polymer, or other type of sealing agent, or combinations thereof.

Figure 4:
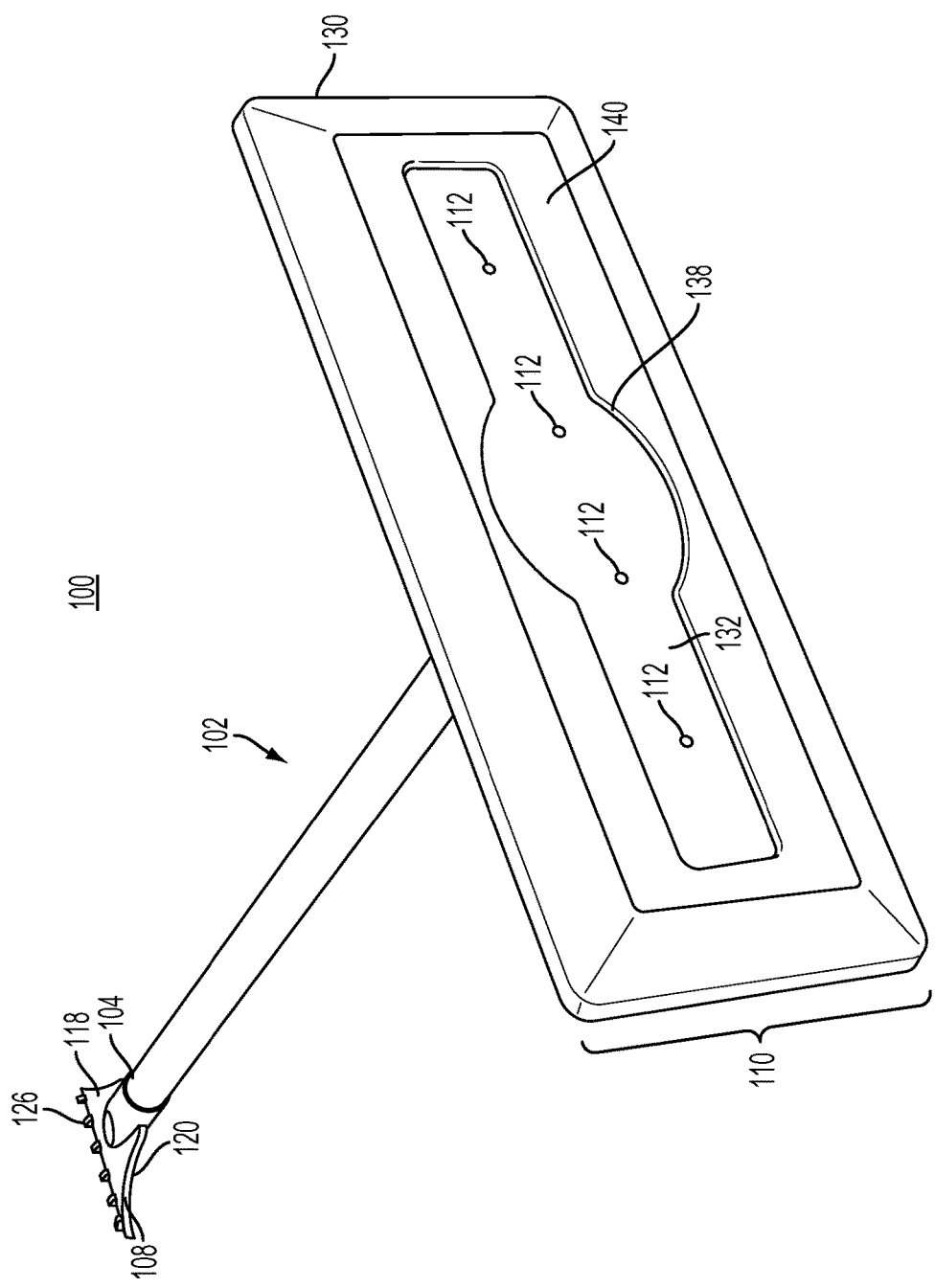
FIG. 4 illustrates a perspective view of another extendable scraper and removal head having lighting elements according to the present disclosure.
Figure 5:
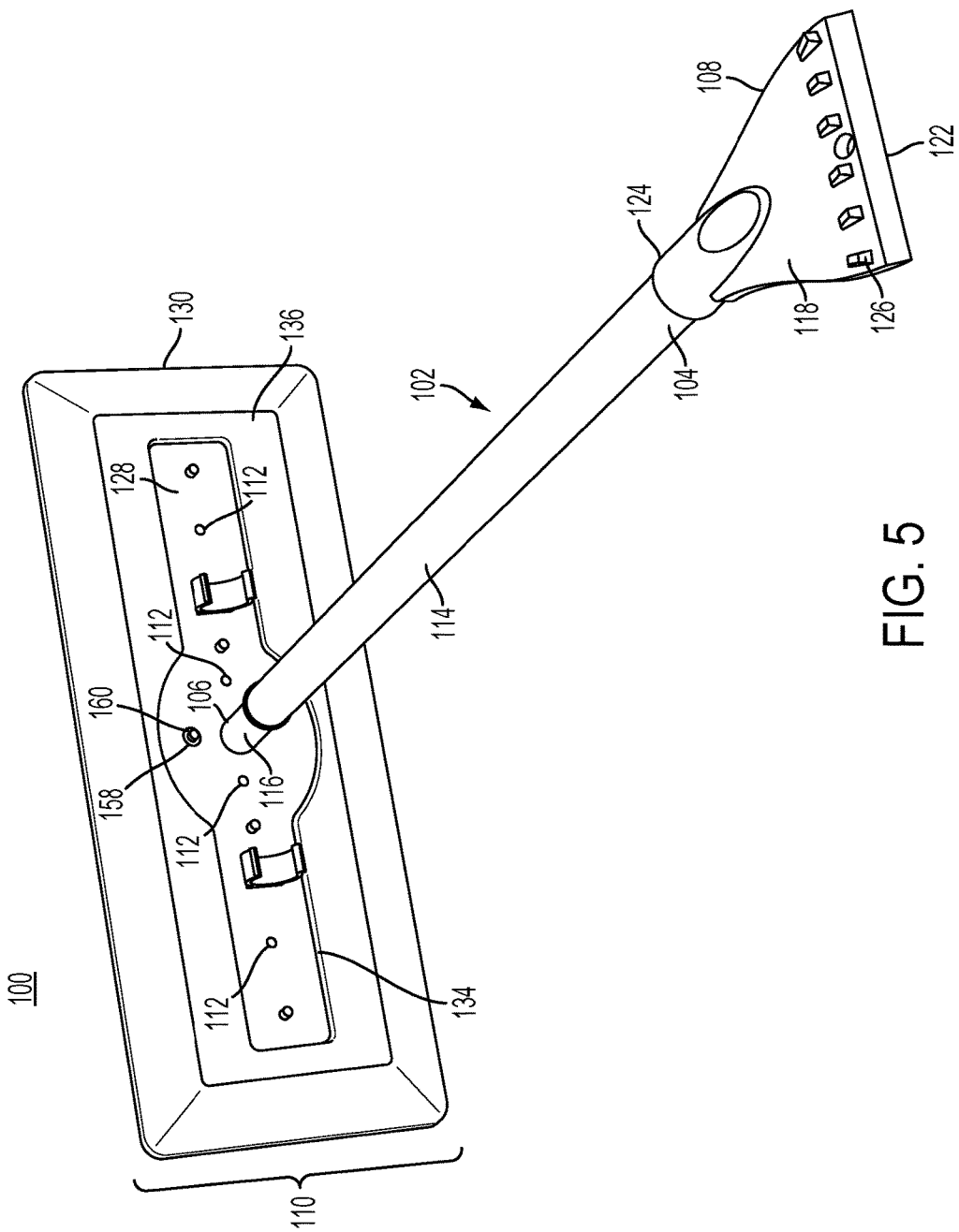
FIG. 5 illustrates a perspective view of another extendable scraper and removal head having lighting elements according to the present disclosure.

As illustrated in FIGS. 1 and 3, there are four light emitting elements 112 arranged in a square-like pattern. However, more or less than four light emitting elements 112 may be incorporated into the device 100 and the light emitting elements 112 may be arranged in varying patterns, such as a linear, circular, triangular, rectangular, polygonal, or other shape of pattern, or combinations thereof. For example, as illustrated in FIG. 4, the light emitting elements 112 may be arranged in a linear pattern extending across the second plate 132. Additionally or alternatively, one or more light emitting elements 112 may be incorporated into the first plate 128, as illustrated in FIG. 5, and emit light in a direction towards the scraper portion 108.

Referring back to FIG. 3, the first plate 128 and the second plate 132 may be coupled together by, for example, one or more fasteners, adhesives, mating protrusions and apertures, and other coupling means of the type. As illustrated, the first plate 128 includes one or more connection apertures 166, and the second plate 132 includes one or more corresponding protrusions 168 that mate with the one or more connection apertures 166. The body portion 130 may also include one or more corresponding apertures 170 configured to receive the one or more protrusions 168. The one or more protrusions 168 may include a head portion 172 configured to be received in a connection aperture 166, and a stem portion 174. The one or more protrusions 168 may extend through the one or more apertures 170 in the body portion 130 and the one or more connection apertures 166 in the first plate 128, and couple the first plate 128 and the second plate 132 together. In other illustrative embodiments, the second plate 132 may include one or more connection apertures and the first plate 128 may include one or more corresponding protrusions.

The removal head 110 also includes a threaded female connection 176, for example, in the first plate 128, and the second end 106 of the extension 102 includes a threaded male connection 188 (illustrated in FIG. 6) configured to engage or mate with the threaded female connection 176 of the removal head 110. In one embodiment, the removal head 110 may include a corresponding aperture 178 in the body portion 130 configured to receive an exterior of the threaded female connection 176, and the second plate 132 may include a corresponding protrusion 180 configured to align with the threaded female connection 176 for support. In other illustrative embodiments, the second end 106 of the extension 102 may include a threaded female connection and the removal head 110 may include a corresponding threaded male connection. The threaded connections allow the removal head 110 to be disconnected, detached, or removed from the extension 102.

Figure 6:
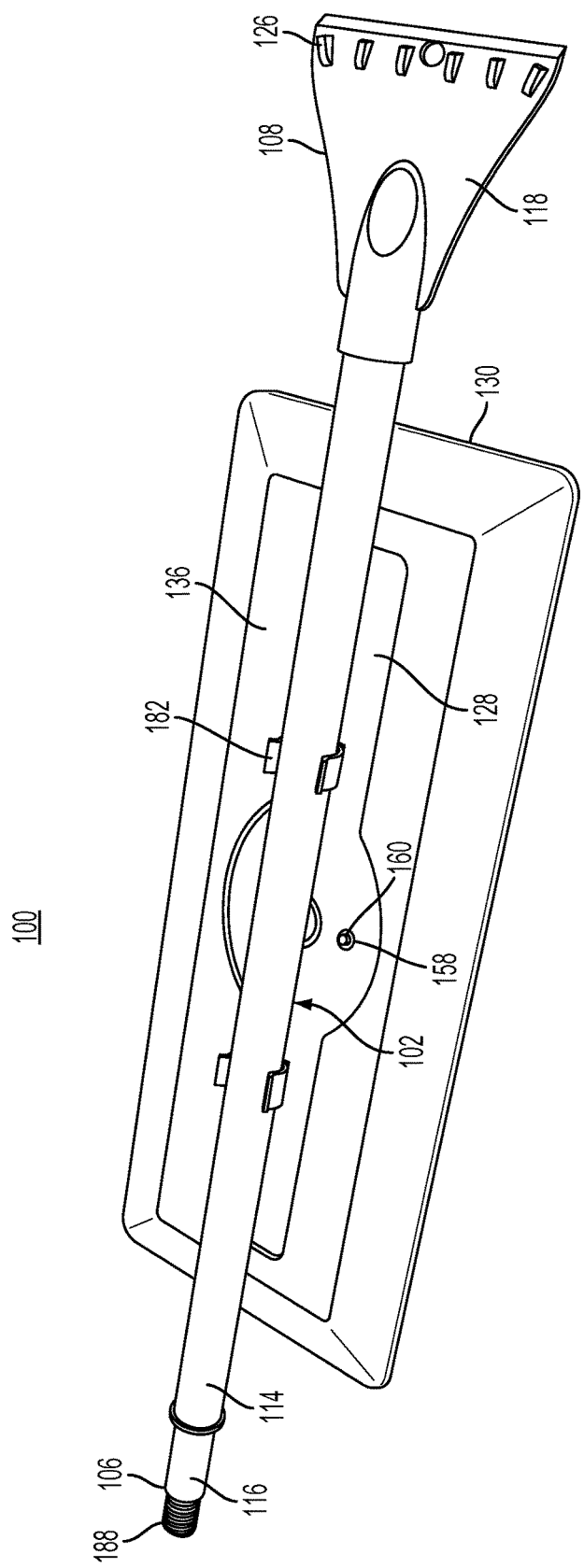
FIG. 6 illustrates a perspective view of an extension of the extendable scraper and removal head coupled to prongs of the removal head.

Referring to FIGS. 3 and 6, in an illustrative embodiment, the removal head 110 may also include one or more connections 182 configured to couple the removal head 110 to the extension 102 along the length of the extension 102 when the device 100 is not in use, for example, during storage of the device 100. The one or more connections 182 may be resiliently deflectable prongs protruding from the first plate 128 of the removal head 110. Other connecting structures may be used as well. The one or more connections 182 may also include one or more protrusions or aligning portions 184 protruding from the first plate 128 opposite the one or more connections 182. The one or more protrusions or aligning portions 184 may be received in one or more corresponding apertures 186 in the body portion 130 of the removal head 110. The resiliently deflectable prongs are shaped to receive and extend around at least a portion of an exterior surface of the extension 102 and couple the removal head 110 to the extension 102, or vice versa, as illustrated in FIG. 6.

In an illustrative embodiment, the length of the extension 102 may be about twenty five (25) inches to about thirty five (35) inches when the extension 102 is fully retracted and about forty five (45) inches to about fifty five (55) inches when the extension 102 is fully extended. Although the length of the extension 102 is described as a range, it should be appreciated that the extension 102 can be modified to have any desired length when retracted and extended.

In an illustrative embodiment, one or more of the scraper portion 108, the extension 102, and the first and second plates 128 and 132, respectively, of the removal head 110 may be made, formed, or molded out of one or more polymers or plastics, for example, high impact polystyrene and other high impact plastics. In other embodiments, one or more of the extension 102 and the first and second plates 128 and 132, respectively, of the removal head 110 may be metal, wood, and/or other material of the type.

In an illustrative embodiment, the body portion or head 130 of the removal head 110 may be made, formed, or molded out of a flexible and durable polymer, for example, polyethylene foam. The polyethylene foam can provide a non-abrasive, freeze resistant, and durable body portion or head 130 that can be used to remove snow and other debris, for example, leaves, dirt, sticks, and branches, from vehicles and other surfaces.

In an illustrative embodiment, the removal head 110 and the extension 102 may be connected via an articulation joint, for example, a ball joint, to allow the removal head 110 to be rotated and position at varying angles with respect to the extension 102. Further, the articulation joint may include a lock configured to secure the position of the removal head 110 in a desired orientation.

Although the extension 102 is illustrated as having a circular cross-section, it should be appreciated that the extension 102 may have a cross-section of various other geometric shapes, for example, oval, square, and other geometric shapes. Similarly, although the body portion or head 130 of the removal head 110 is illustrated as rectangular, it should be appreciated that the body portion or head 130 may be various other geometric shapes, for example, oval, circular, square, and other geometric shapes.

Although the removal head 110 is described and illustrated as including the first plate 128 and the second plate 132 that are coupled together, the first plate 128 and the second plate 132 may be monolithically formed or molded as a single piece. Further, it should be appreciated that other locking mechanisms may be used to lock the extension 102 at a desired length instead of the locking feature described herein.

Although the device has been described and illustrated in connection with certain embodiments, many variations and modifications will be evident to those skilled in the art and may be made without departing from the spirit and scope of the disclosure. The disclosure is thus not to be limited to the precise details of methodology or construction set forth herein as such variations and modification are intended to be included within the scope of the disclosure. Moreover, unless specifically stated any use of the terms first, second, etc. do not denote any order or importance, but rather the terms first, second, etc. are merely used to distinguish one element from another.

What is claimed is:

1. A snow removal tool, comprising:
   a handle having a first end and a second end opposite the first end;
   a snow scraper portion coupled to the first end;
   a laterally extended snow removal head coupled to the second end;
   a light emitting element coupled to the laterally extended snow removal head; and
   a battery housing coupled to the light emitting element.

2. The snow removal tool according to claim 1, further comprising a first plate disposed in a first recess on a first side of the laterally extended snow removal head, the first plate having a threaded connection configured to couple the laterally extended snow removal head to the second end.

3. The snow removal tool according to claim 2, further comprising a second plate disposed in a second recess on a second side of the laterally extended snow removal head, the second plate configured to couple to the first plate.

4. The snow removal tool according to claim 3, wherein the light emitting element is disposed in the second plate and the light emitting element emits light in a direction away from the handle.

5. The snow removal tool according to claim 4, wherein the second plate includes a battery housing extending from the second plate in a direction towards the first plate, and the battery housing is electrically coupled to the light emitting element.

6. The snow removal tool according to claim 5, further comprising a battery housing cap coupled to the battery housing, the battery housing cap including a switch configured to turn on and off the light emitting element.

7. The snow removal tool according to claim 2, wherein the first plate includes a substantially oval central portion and substantially rectangular portions extending in opposite directions from the substantially oval central portion.

8. The snow removal tool according to claim 7, wherein the substantially oval central portion has a width larger than a width of the substantially rectangular portions.

9. The snow removal tool according to claim 3, wherein the second plate includes a substantially oval central portion and substantially rectangular portions extending in opposite directions from the substantially oval central portion.

10. The snow removal tool according to claim 5, wherein the battery housing cap extends through an aperture in the first plate and mates with the battery housing, and the switch is accessible to a user from an external side of the first plate.

11. A snow removal tool, comprising:
a laterally extended snow removal head having a first side and a second side opposite the first side;
a first plate disposed on the first side;
a second plate disposed on the second side;
a handle having a first end coupled to the first plate;
a light emitting element coupled to the second plate and configured to emit light in a direction away from the first plate; and
a battery housing coupled to the light emitting element.

12. The snow removal tool according to claim 11, wherein the second plate includes a battery housing extending from the second plate in a direction towards the first plate, and the battery housing is electrically coupled to the light emitting element.

13. The snow removal tool according to claim 12, further comprising a battery housing cap coupled to the battery housing, the battery housing cap including a switch configured to turn on and off the light emitting element.

14. The snow removal tool according to claim 13, wherein the battery housing cap extends through an aperture in the first plate and mates with the battery housing, and the switch is accessible to a user from an external side of the first plate.

15. The snow removal tool according to claim 11, further comprising at least one resiliently deflectable prong protruding from the first plate and configured to receive and extend around at least a portion of an exterior of the handle and couple the handle to the first plate in a lengthwise orientation when the first end of the handle is removed from coupling with the first plate.

16. The snow removal tool according to claim 15, wherein the at least one resiliently deflectable prong includes a first resiliently deflectable prong and a second resiliently deflectable prong.

17. The snow removal tool according to claim 11, wherein the handle is configured to extend telescopically.

18. The snow removal tool according to claim 11, wherein the handle includes a second end opposite the first end, and further comprising a snow scraper coupled to a second end.

19. The snow removal tool according to claim 11, further comprising a second light emitting element coupled to the first plate and configured to emit light in a direction away from the second plate.

20. The snow removal tool according to claim 11, wherein the light emitting element includes more than one light emitting element arranged in a pattern.

\* \* \* \* \*